US012654849B2

(12) United States Patent
Lerro et al.

(10) Patent No.: US 12,654,849 B2
(45) Date of Patent: Jun. 16, 2026

(54) VERTICAL TAKE-OFF AND LANDING MODULE OF A FIXED WING AIRCRAFT, AND RELATED METHOD AND SYSTEM

(71) Applicant: POLITECNICO DI TORINO, Turin (IT)

(72) Inventors: Angelo Lerro, Turin (IT); Piero Gili, Turin (IT)

(73) Assignee: POLITECNICO DI TORINO, Turin (IT)

( * ) Notice: Subject to any disclaimer, the term of this patent is extended or adjusted under 35 U.S.C. 154(b) by 0 days.

(21) Appl. No.: 18/705,001

(22) PCT Filed: Oct. 31, 2022

(86) PCT No.: PCT/IB2022/060474
§ 371 (c)(1),
(2) Date: Apr. 26, 2024

(87) PCT Pub. No.: WO2023/079433
PCT Pub. Date: May 11, 2023

(65) Prior Publication Data
US 2024/0417071 A1      Dec. 19, 2024

(30) Foreign Application Priority Data
Nov. 3, 2021    (IT) ........................ 102021000028016

(51) Int. Cl.
*B64C 29/00*        (2006.01)
*B64C 27/30*        (2006.01)
*B64U 30/296*       (2023.01)
(52) U.S. Cl.
CPC .......... *B64C 29/0016* (2013.01); *B64C 27/30* (2013.01); *B64U 30/296* (2023.01); *B64C 2211/00* (2013.01)

(58) Field of Classification Search
CPC ... B64C 29/0016; B64C 27/30; B64U 30/293; B64U 30/294; B64U 30/296
See application file for complete search history.

(56) References Cited

U.S. PATENT DOCUMENTS 10,549,850 B1 *  2/2020  Ryan ...................... B64U 20/50
12,202,625 B2 *  1/2025  Kempley ................ F41F 3/042
(Continued)

FOREIGN PATENT DOCUMENTS

DE        102018116152        1/2020
EP        3335989        6/2018
(Continued)

OTHER PUBLICATIONS

International Search Report and the Written Opinion Dated Jan. 17, 2023 From the International Searching Authority Re. Application No. PCT/IB2022/060474. (11 Pages).
(Continued)

*Primary Examiner* — Nicholas McFall

(57) ABSTRACT

The present invention relates to a vertical take-off and landing module (200) for a fixed-wing aircraft (110), which includes at least one vertically-acting propulsion unit (240), actuator means (245) and support means (230), so as to be adapted to be operatively connected to said aircraft (110).
The actuator means (245) can move the propulsion unit (240) from the inside of the module (200) towards the outside, and vice versa, so that the propulsion unit (240) is adapted to generate a substantially vertical propulsive force during the aircraft take-off and landing phases.

18 Claims, 8 Drawing Sheets

(56)                References Cited

U.S. PATENT DOCUMENTS

| | | | |
|---|---|---|---|
| 2018/0237132 A1* | 8/2018 | Liu | B64U 10/20 |
| 2019/0337613 A1* | 11/2019 | Villa | B64C 23/00 |
| 2021/0031910 A1* | 2/2021 | Cornes | B64C 27/30 |
| 2022/0185501 A1* | 6/2022 | Kempley | B64U 70/70 |
| 2024/0025540 A1* | 1/2024 | Tavin | B64C 11/48 |

FOREIGN PATENT DOCUMENTS

| | | |
|---|---|---|
| EP | 3771637 | 2/2021 |
| ES | 2706658 | 3/2019 |

OTHER PUBLICATIONS

Rapporto di Ricerca e l'Opinione Scritta [Search Report and the Written Opinion] Dated May 30, 2022 From the Ministero Dello Sviluppo Economico, Direzione Generale Sviluppo Produttivo e Competitivita, Ufficio Italiano Brevetti e Marchi Re. Application No. IT 202100028016. (8 Pages).

* cited by examiner

VERTICAL TAKE-OFF AND LANDING MODULE OF A FIXED WING AIRCRAFT, AND RELATED METHOD AND SYSTEM

RELATED APPLICATIONS

This application is a National Phase of PCT Patent Application No. PCT/IB2022/060474 having International filing date of Oct. 31, 2022, which claims the benefit of priority of Italy Patent Application No. 102021000028016 filed on Nov. 3, 2021. The contents of the above applications are all incorporated by reference as if fully set forth herein in their entirety.

FILED AND BACKGROUND OF THE INVENTION

The present invention relates to a fixed-wing aircraft and a vertical take-off and landing module for a fixed-wing aircraft. In particular, the following will illustrate a module, a method and a system allowing a fixed-wing aircraft to take off and land vertically relative to a supporting plane under such aircraft.

The present invention can be used in order to permit a conventional fixed-wing aircraft, originally designed to take off and land horizontally, to take off and land vertically.

According to the present invention, the aircraft may be a small-size one intended for transporting people and/or things, such as, for example, a two-seat Tecnam P2008 airplane, a four-seat Tecnam P2010 airplane, a six-seat Cessna Stationair HD airplane, etc.

With a view to implementing urban air mobility (UAM), it has become increasingly important to develop new vertical take-off and landing aircraft well suited to an urban context. This field of application is only accessible to latest-generation aircraft with electric propulsion and vertical take-off and landing capability. All such UAM aircraft come from innovative designs and can be divided into the following four categories: I) vertical thrust multicopters, vertical and horizontal thrust aircraft, aircraft with pivoting propellers, and aircraft with vectored ducted thrust propellers.

The different technologies proposed for such categories must solve the problem of combining the advantages of fixed-wing aircraft, having high aerodynamic efficiency for long journeys, with the advantages of vertical take-off and landing aircraft, such as helicopters, which however have limited mileage and/or load capacity. In fact, the various configurations aim at using the electric propulsion while introducing complex mechanisms for orienting the aircraft's thrust. Only a few aircraft categories, e.g. multicopters or vertical and horizontal thrust aircraft, can at present obtain flight approval from one or more certifying bodies, notwithstanding their low aerodynamic efficiency.

The above-described aircraft suffer from a number of drawbacks, which will be illustrated below.

A first drawback lies in the fact that such aircraft must necessarily be very complex mechanically in order to be able to manage two or more orientable and/or fixed propellers. This inevitably results in higher costs of such aircraft.

A second drawback comes from the fact that such aircraft suffer from low aerodynamic efficiency. This implies excessive energy consumption and limited mileage.

A further drawback lies in the fact that such aircraft require a complex flight approval process on the part of the certifying bodies. This inevitably results in increased aircraft costs and development times.

It is therefore one object of the present invention to solve these and other problems of the prior art, and particularly to provide a module, a method and a system for vertical take-off and landing of a fixed-wing aircraft which make it possible to reduce the mechanical complexity of the aircraft.

It is another object of the present invention to provide a module, a method and a system for vertical take-off and landing of a fixed-wing aircraft which make it possible to maintain a good aerodynamic efficiency of the aircraft during the cruising phase.

It is a further object of the present invention to provide a module, a method and a system for vertical take-off and landing of a fixed-wing aircraft which make it possible to reduce the complexity of the flight approval process, on the part of certifying bodies, for such aircraft.

SUMMARY OF THE INVENTION

In brief, the basic idea of the invention is to connect or anchor a vertical take-off and landing module to a conventional fixed-wing aircraft. In particular, the module comprises at least one propulsion unit, more preferably at least four propulsion units, and actuator means adapted to move said at least one propulsion unit from the inside of the module 200 towards the outside, and vice versa; preferably, each propulsion unit is adapted to generate a propulsive force substantially perpendicular to a supporting plane under the aircraft. The idea of the invention is also applicable to an aircraft natively comprising the above-mentioned module.

The advantageous features of the present invention are set out in the appended claims, which are an integral part of the present description.

BRIEF DESCRIPTION OF THE SEVERAL VIEWS OF THE DRAWINGS

The invention will now be described in detail through some non-limiting exemplary embodiments thereof, with particular reference to the annexed drawings, wherein:

FIG. 1b schematically shows a front view of the system of FIG. 1a;

DESCRIPTION OF SPECIFIC EMBODIMENTS OF THE INVENTION

Figure 1A:
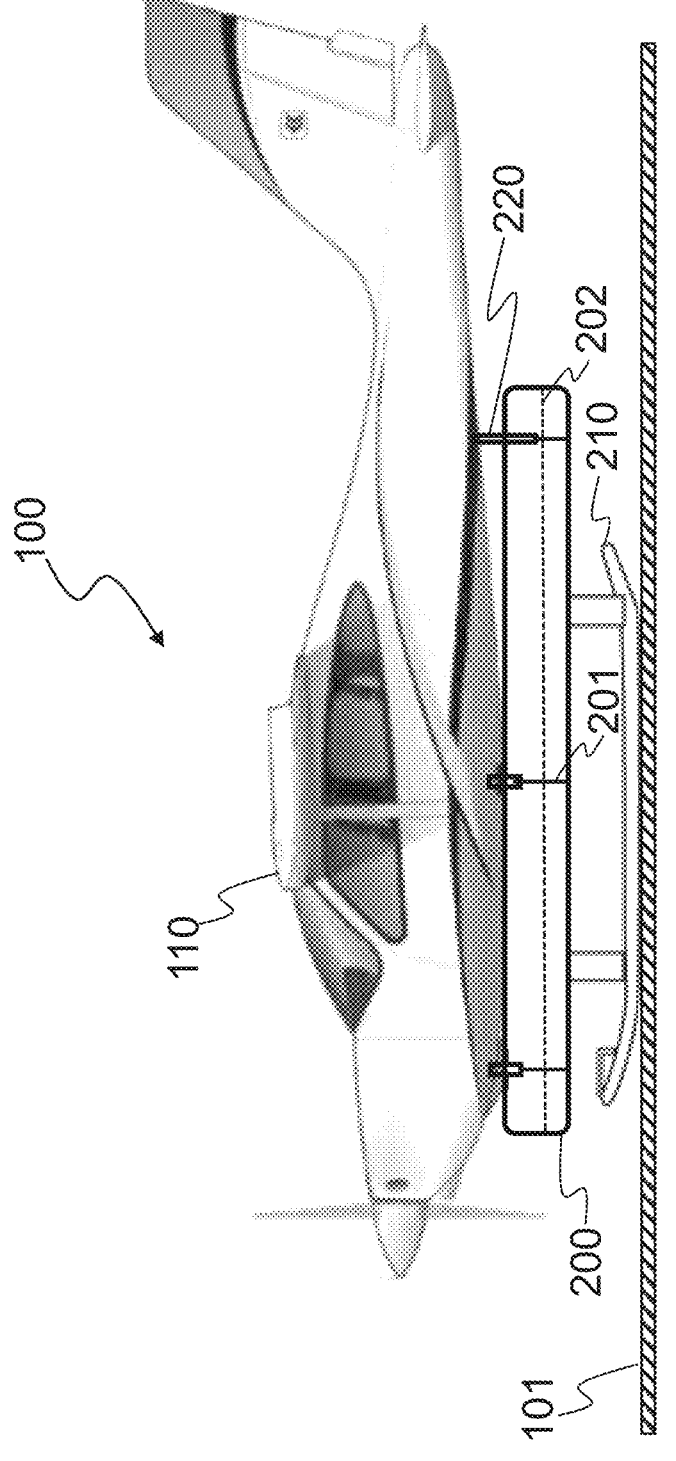
FIG. 1a schematically shows a side view of a system for vertical take-off and landing of a fixed-wing aircraft relative to a supporting plane, in accordance with one embodiment of the present invention.
Figure 1B:
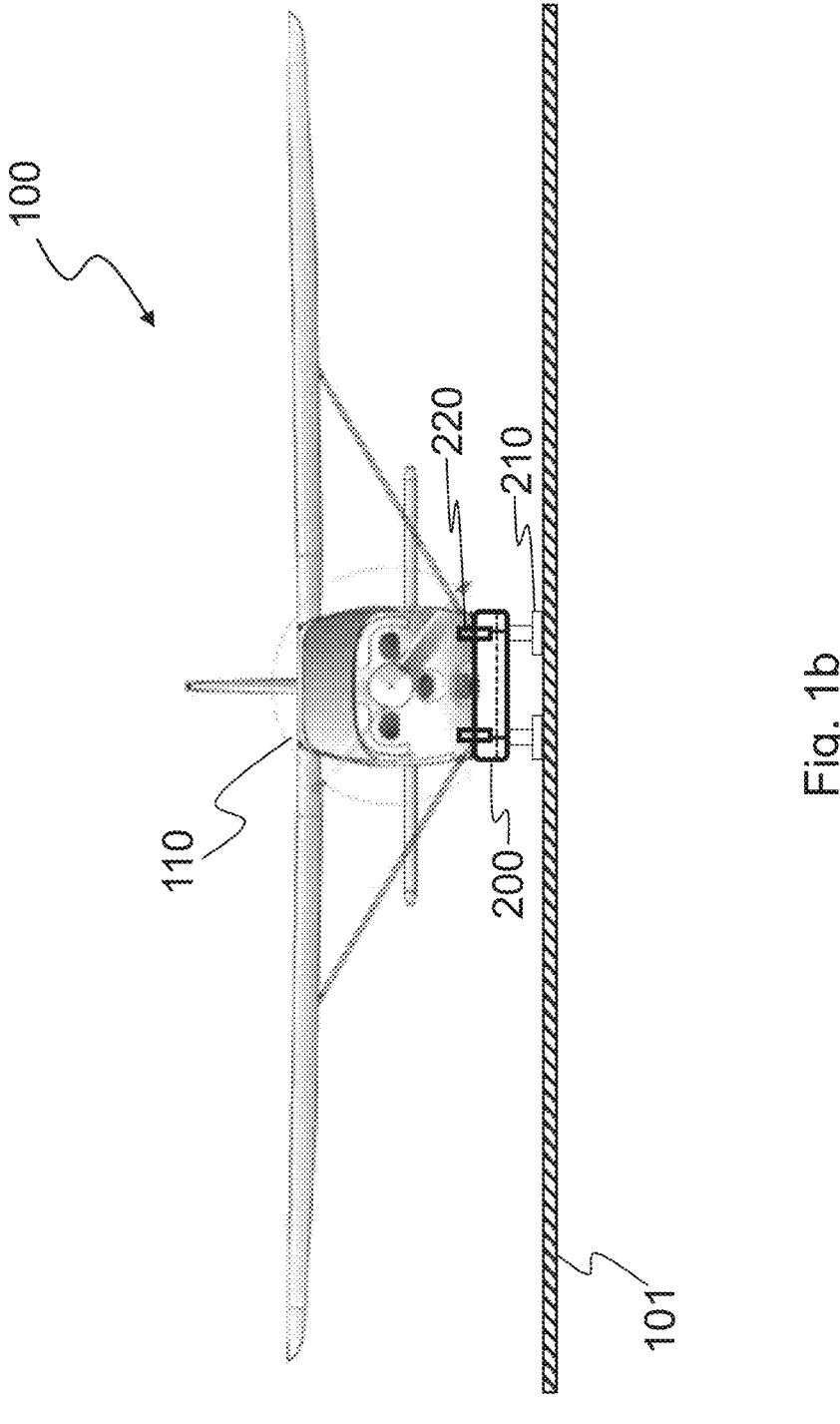

With reference to FIGS. 1a and 1b, there are shown, respectively, a side view and a front view of a system 100 for vertical take-off and landing of a fixed-wing aircraft 110 relative to a supporting plane 101 under the aircraft 110. For example, the supporting plane 101 may be substantially perpendicular to a direction of the weight force of the aircraft 110. The aircraft 110 may be a conventional fixed-wing aircraft, originally designed for horizontal take-off and landing, e.g. for using a take-off and landing runway suitably sized for the type of aircraft 110.

The system 100 comprises a vertical take-off and landing module 200 for the aircraft 110, which can be operatively connected to the aircraft 110. For example, the module 200 can be anchored to a portion of the fuselage of the aircraft 110, e.g. through anchoring means 220, e.g. replacing one or more undercarriages of the aircraft 110, so as to be made integral with the aircraft 110. The anchoring means 220 may comprise one or more of the following elements: rivets, screws, bolts, hooks, buttons, clamps, pins and brackets. In the present embodiment of the invention, the module 200 comprises a support structure 210 that supports the aircraft 110, e.g. skids. Such support structure 210 may allow parking the aircraft 110 on the supporting surface 101; in addition, the support structure 210 may be retractable when the aircraft is flying. The support structure 210 may comprise metal and/or composite elements, e.g. tubes and/or bars, suitably configured to bear the weight of the aircraft 110 and module 200. In addition, the support structure 210 may comprise one or more wheels or castors (not shown in FIGS. 1a and 1b) allowing the aircraft 110 to be partly or fully moved on the supporting surface 101.

Figure 2:
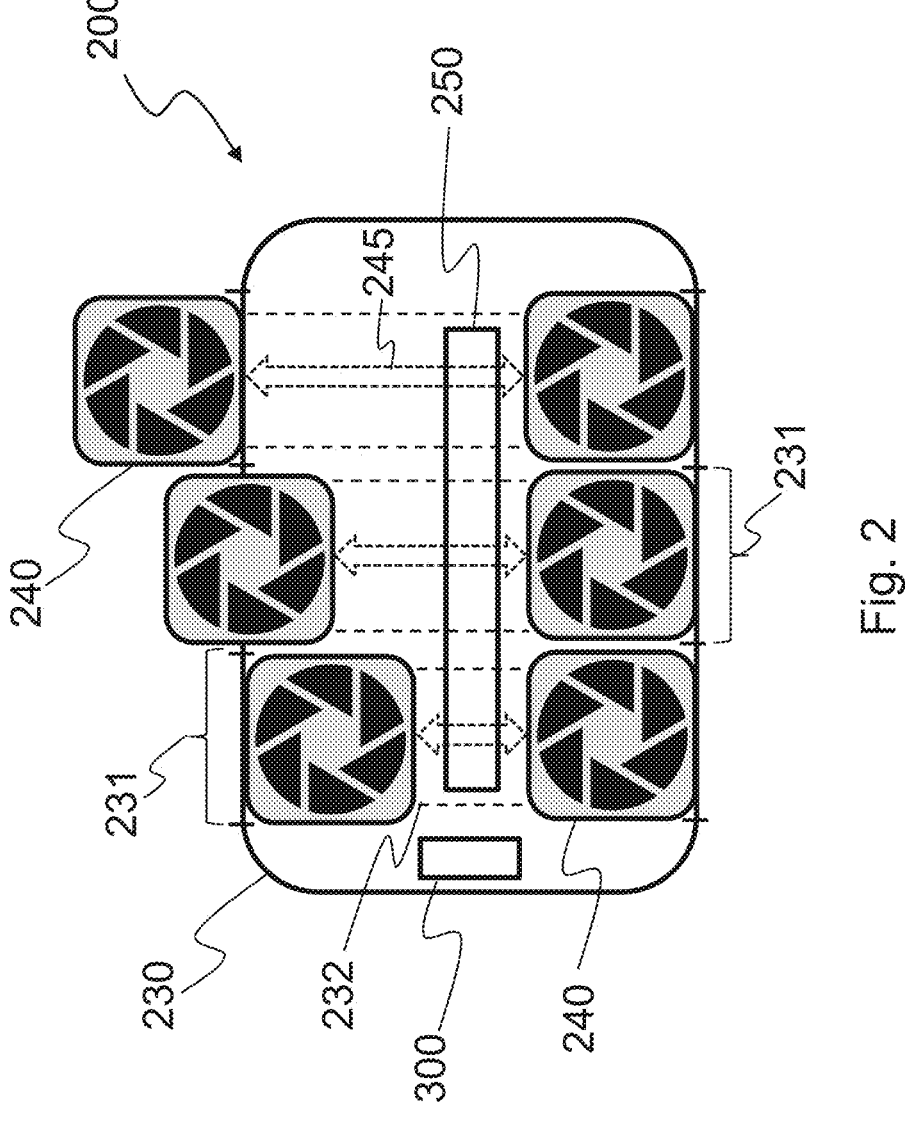
FIG. 2 schematically shows a functional diagram of a vertical take-off and landing module of the system shown in FIGS. 1a and 1b.

FIG. 2 schematically exemplifies a functional diagram of the vertical take-off and landing module 200 for the aircraft 110 of the system 100. The module 200 may comprise at least one propulsion unit 240, preferably at least four propulsion units 240, and actuator means 245. Such actuator means 245 are adapted to move at least one propulsion unit 240 from the inside of the module 200 towards the outside, and vice versa, transversally to the aircraft 110.

In accordance with the preferred embodiment of the invention shown in FIG. 2, the propulsion units 240 are arranged symmetrically on opposite sides relative to the longitudinal axis, or anyway a median plane, of the aircraft 110: this feature provides a number of advantageous effects.

First and foremost, the distribution of the weights of the propulsion units 240 is balanced in relation to the aircraft, both when the aircraft 110 is in the take-off and landing condition, i.e. when the units 240 are extended out of the module 200, and when the aircraft 110 is in the flight condition, i.e. when the units 240 are retracted in the module 200.

As can be easily understood, a balanced weight distribution is important to ensure stability of the aircraft both in normal flight conditions and when making vertical take-off and landing maneuvers, as well as to avoid any rolling phenomena.

Likewise, the symmetrical arrangement of the propulsion units 240 on opposite sides permits keeping the center of gravity of the module 200, and that of the aircraft 110 associated therewith, in a stable position in both the retracted and extended conditions of the units 240.

Each propulsion unit 240 is adapted to generate a propulsive force which is substantially perpendicular to the supporting plane 101.

Figure 7:
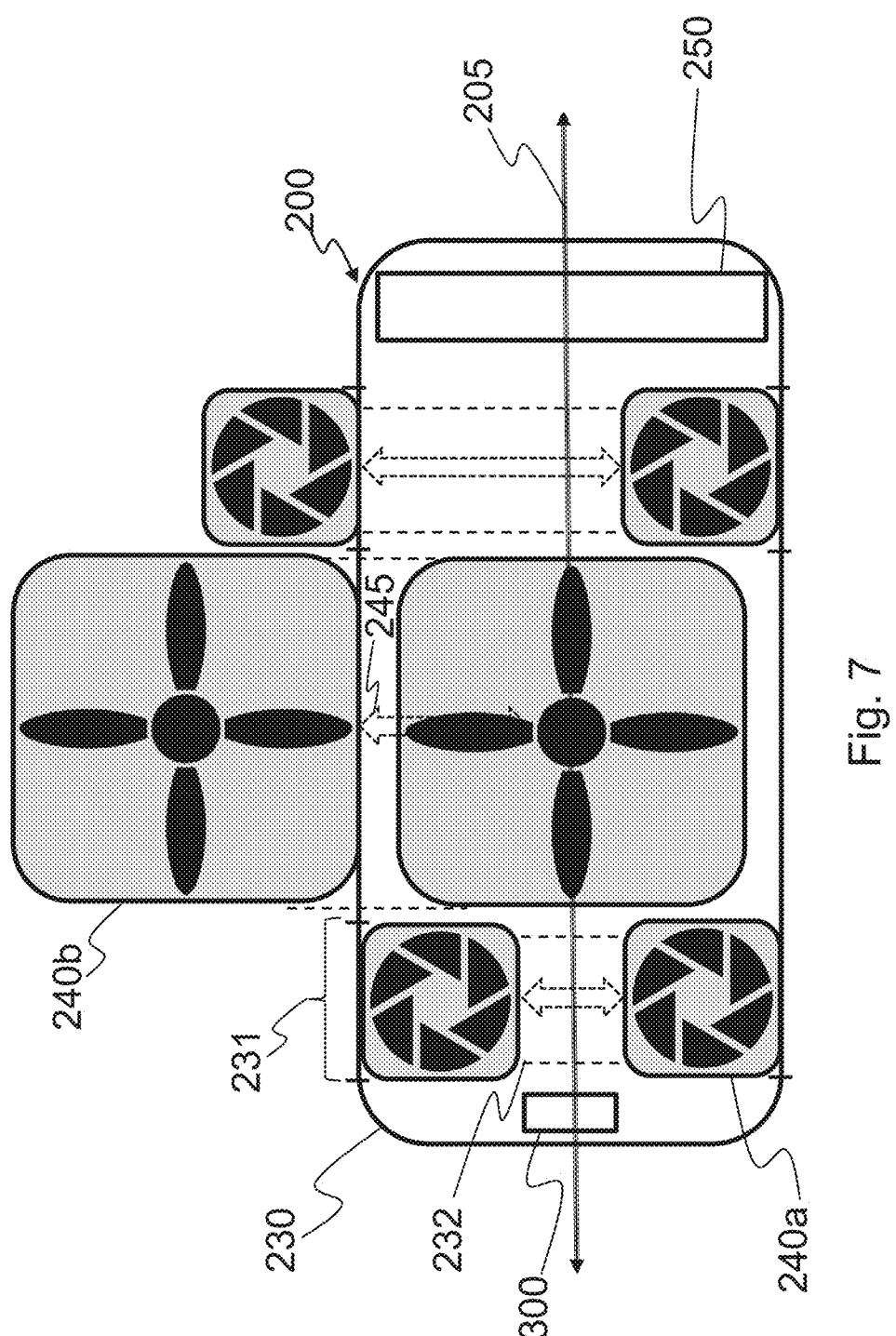
FIG. 7 schematically shows a further functional diagram of a vertical take-off and landing module in accordance with the present invention.

For example, in accordance with the present embodiment of the invention, the module 200 comprises six propulsion units 240 arranged inside the module 200 in two rows, i.e. a first row along a first side of the module 200 and a second row along a second side of the module 200. In another embodiment of the invention, as shown in FIG. 7, the module 200 may comprise two or more propulsion units 240, e.g. arranged side-by-side and/or stacked, in order to obtain a balanced vertical thrust relative to a longitudinal axis 205 of the aircraft 110.

The module 200 comprises three actuator means 245, each one operatively connected to a propulsion unit 240 in the first row and to a propulsion unit 240 in the second row.

The actuator means are adapted to move the propulsion units 240, to which they are operatively connected, from the inside of the module 200 towards the outside, and vice versa, transversally to the aircraft 110 as previously explained herein. For example, the actuator means may move the propulsion units 240 along two or more guides 232 operatively connected to the propulsion units 240. In another embodiment of the invention, each propulsion unit 240 may be operatively connected individually to the actuator means 245. In a further embodiment of the invention, the actuator means 245 may be operatively connected to all the propulsion units 240 of the module 200. For example, the actuator means 245 may comprise at least one servo mechanism, preferably an electromechanical one, whether linear or nonlinear, suitably configured to move at least one propulsion unit 240. In addition or as an alternative, the actuator means 245 may comprise at least one electropneumatic and/or pneumatic servo mechanism.

In particular, the module 200 may comprise two or more frames 201 and two or more ribs 202 configured to define a support structure 230 of the module 200 itself, as shown in FIG. 1a. This support structure 230 is adapted to be anchored, through the anchoring means 220, to at least one portion of the fuselage of the aircraft 110. In particular, the frames 201 are adapted to give mechanical strength to the support structure 230, while the ribs 202 are adapted to define a shape of the module 200. Each one of the two or more frames 201 are adapted to be anchored to at least one further frame of the portion of the fuselage of the aircraft 110 through anchoring means 220 which may comprise one or more of the following elements: rivets, screws, bolts, hooks, buttons, clamps, pins and brackets.

The frames and/or the ribs may comprise further metal elements or further composite elements, e.g. tubes and/or bars, suitably configured to define the support structure 230 of the module 200.

The support structure 230 of the module 200 may be coated with a covering comprising, for example, a thin sheet of a metallic material, e.g. aluminum, and/or a composite material, e.g. carbon fiber and/or fiberglass. The covering may be suitably shaped to ensure a good aerodynamic efficiency of the system 100, i.e. of the aircraft 110 and the module 200, when the aircraft 110 with the module 200 connected thereto is in flight and/or landing or taking off. In addition or as an alternative, the module 200 may comprise at least one aerodynamic element (not shown in FIGS. 1a and 1b), made of a suitably shaped metallic and/or composite material, which, by integrating itself with the fuselage of the aircraft 110, can minimize the aerodynamic resistance of the system 100.

In accordance with the present embodiment of the invention, the module 200 may comprise at least one opening 231 in the support structure 230, wherein such opening 231 may be configured to allow at least one propulsion unit 240 to be moved from a region internal to the module 200, defined by the support structure 230 itself, to a region external to the module 200, and vice versa. Thus, the propulsion units 240 can be moved, whether simultaneously or not, by the actuator means 245 from the inside of the module 200 towards the outside, and vice versa, through the openings 231. The openings 231 are so configured that the propulsion units 240, once they have been moved out of the module 200, can generate a propulsive force which is substantially perpendicular to the supporting plane 101. In addition, the openings 231 are so configured that one or more propulsion units 240, as they are moved into the module 200, can partially or completely close the openings 231 by means of a portion of the external surface of one or more propulsion units 240. In the present embodiment of the invention there may be one opening 231 per propulsion unit 240. In another embodiment of the invention, two or more propulsion units 240 may share the same opening 231.

Figures 3A, 3B:
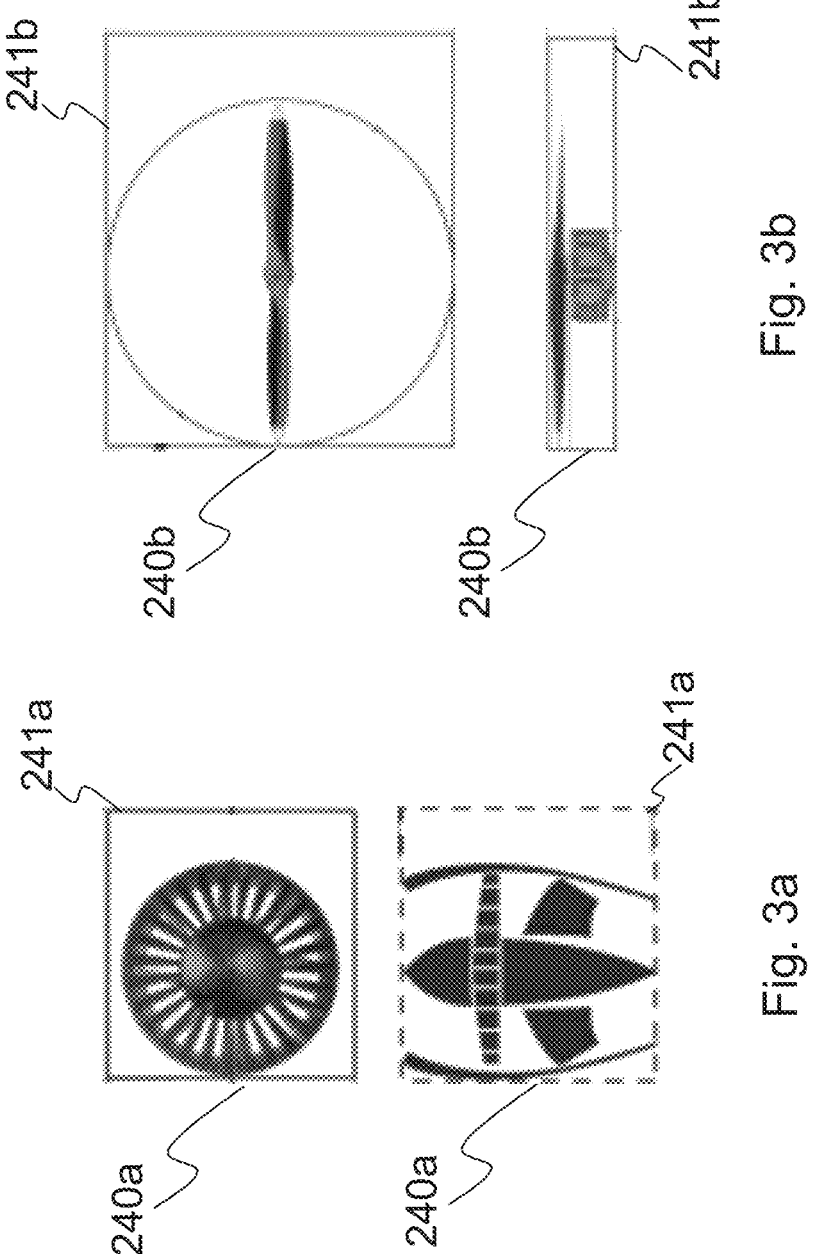
FIGS. 3a and 3b show, respectively, two possible types of propulsion units which can be used in the module of FIG. 2.

With reference to FIG. 3a, in one embodiment of the invention the propulsion unit 240 may comprise a ducted fan propeller 240a, which can be housed in a first support 241a. In addition or as an alternative, with reference to FIG. 3b, the propulsion unit 240 may comprise a blade propeller 240b that can be housed in a second support 241b. The blades of two or more blade propellers 240b adjacent to each other may partially overlap. The first support 241a and the second support 241b may comprise a suitably shaped, and at least partially covered, metal frame. Preferably, the ducted fan propeller 240a and the blade propeller 240b may be electric, i.e. they may comprise an electric motor.

In accordance with the present embodiment of the invention, the module 200 may further comprise a control unit 300, which will be described in detail below with reference to FIG. 4, and power supply means 250 adapted to supply power to one or more propulsion units 240, to the actuator means 245, and to the control unit 300. For example, such power supply means 250 may comprise lithium-ion batteries, nickel-cadmium batteries, and power supply circuits connectable to the electric grid.

It will be apparent to those skilled in the art that the number N of propulsion units 240 of the module 200 may depend on the type and/or model of the aircraft 110 and/or on the propulsive force that can be generated by each propulsion unit 240. Such number N of propulsion units 240 of the module 200 may, for example, be determined in accordance with the following iterative procedure:

I) an unladen weight value $P_0$ of the system 100 is determined, e.g. considering an unladen weight value of the aircraft 110 and an unladen weight value of the support structure 230 of the module 200;

II) a maximum weight value $P_M$ of the system 100 at take-off is assumed, with $P_M \geq P_0$;

III) the number N of propulsion units 240 for take-off and landing of the system 100 is determined, for example, in accordance with the following relation: $N = P_M / F$, where F is the propulsive force generated by each propulsion unit 240;

IV) a weight value $P_A$ of the power supply means 250 necessary for supplying power, for an operating time interval T, to the N propulsion units 240 is determined. The operating time interval T may comprise a first time interval for the take-off of the system 100, a second time interval for the landing of the system 100, and a reserve third time interval of the system 100. For example, the operating time interval T may range from two to six minutes. In particular, indicating as W a value of the power that is drawn by each propulsion unit 240 in order to generate the propulsive force F, it is possible to determine an energy value E that can be stored by the power supply means 250 as: $E = N*W*T$, based on which the power supply means 250 can be appropriately sized, i.e. from which one can determine the value $P_A$ of the weight of the power supply means 250;

V) a total weight value $P_{tot}$ is calculated as: $P_{tot} = P_0 + P_A + N*P$, where P is a weight value of each propulsion unit 240;

VI) if the value $P_{tot}$ is greater than $P_M$, then the procedure will return to step II assuming that $P_{tot} = P_M$, otherwise the procedure will end considering the value of N obtained at step III.

Figure 4:
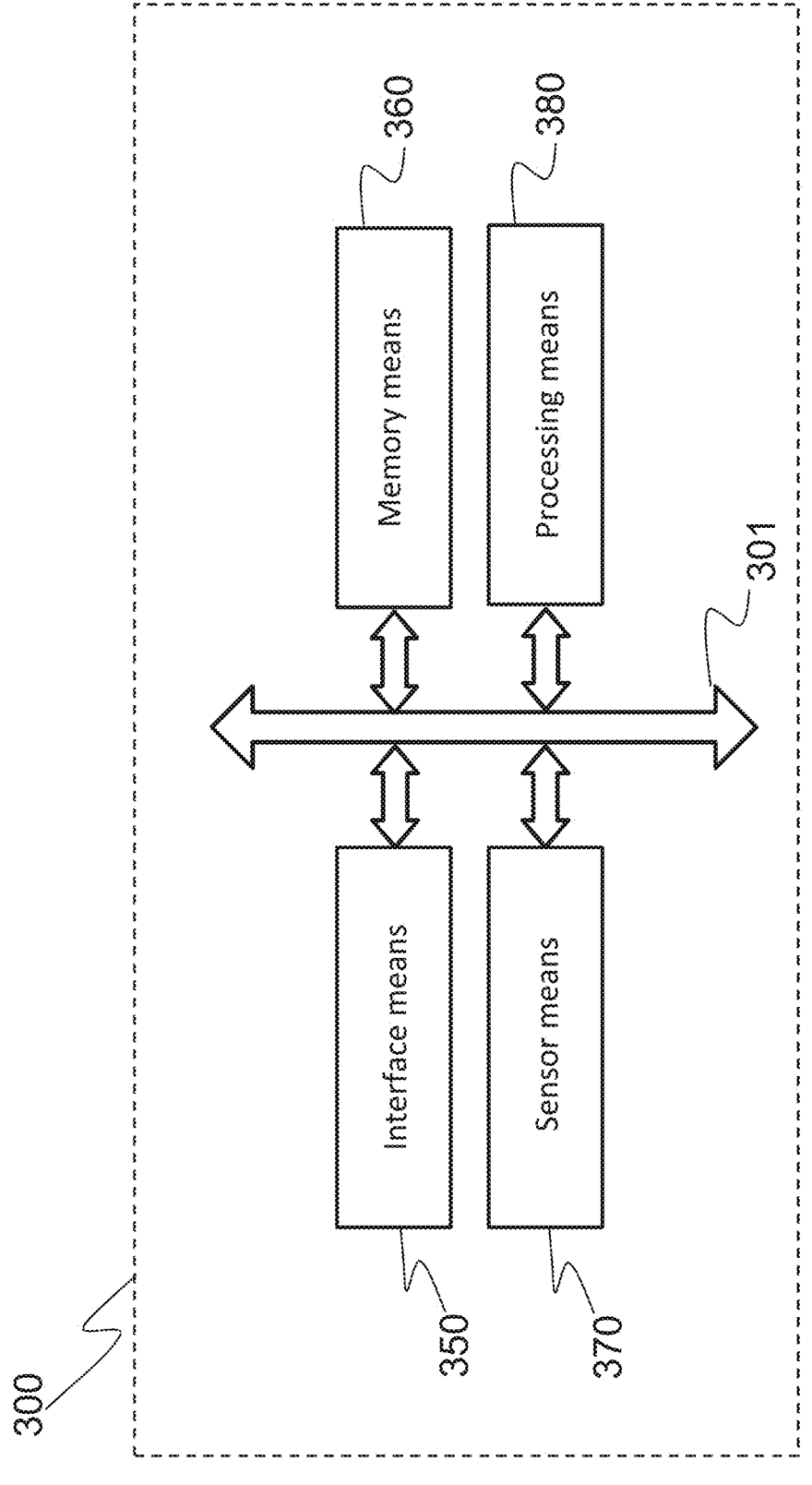
FIG. 4 is a block diagram of a control unit of the module of FIG. 2.

FIG. 4 shows an illustrative block diagram of the control unit 300 in accordance with the present embodiment of the invention. Such control unit 300 is adapted to control at least one propulsion unit 240 and the actuator means 245 of the vertical take-off and landing module 200 of the aircraft 110.

The control unit 300 may comprise interface means 350, memory means 360, sensor means 370, and processing means 380. Such means can be interconnected via a communication bus 301.

The sensor means 370 are adapted to measure one or more physical quantities for controlling, for example: one or more propulsion units 240, the actuator means 245, a flight state of the system 100, an operating state of the power supply means 250, and so forth. The sensor means 370 may comprise one or more of the following sensors: an inertial measurement unit (IMU), a gyroscope, an accelerometer, an altimeter, a thermometer, a barometer, a piezoelectric sensor, an extensometer, a load cell, a voltmeter, an ammeter.

The interface means 350 are adapted to operatively connect the control unit 300 to a control unit of the aircraft 110, so as to receive first electric signals, whether analog or digital, representative of commands issued by a pilot of the aircraft 110 and/or coming from sensors of the aircraft 110 itself. In addition, the interface means 350 may transmit to the control unit of the aircraft 110 second electric signals, whether analog or digital, representative of the physical quantities measured by the sensor means 370 and/or of commands determined by the control unit 300 itself, for controlling at least one propulsion unit 240 and the actuator means 245 of the module 200. The interface means 350 may comprise, for example, a USB, CANBUS, etc. interface.

The memory means 360 are adapted to store the information and the instructions of the control unit 300 for controlling at least one propulsion unit 240 and the actuator means 245 of the vertical take-off and landing module 200 of the aircraft 110. Such information may include data and/or parameters relating to the sensor means 370 and/or to the first electric signals received from the control unit of the aircraft 110. The instructions stored in the memory means 360 will be described in detail below with reference to the flow chart of FIG. 5. The memory means 360 may comprise, for example, a Flash-type solid-state memory.

The processing means 380 are adapted to process the information and the instructions stored in the memory means 360, relating to the interface means 350 and the sensor means 370, and may comprise, for example, a multicore ARM processor, a microcontroller, etc. The communication bus 301 is adapted to interconnect said interface means 350, said sensor means 370 and said memory means 360 with the processing means 380.

The control unit 300 may be implemented, for example, as a computer program product comprising portions of software code in accordance with the method of the present invention, which can be loaded into a memory of a terminal, such as, for example, a terminal comprising an FPGA board or a SoC-FPGA board, etc.

Figure 5:
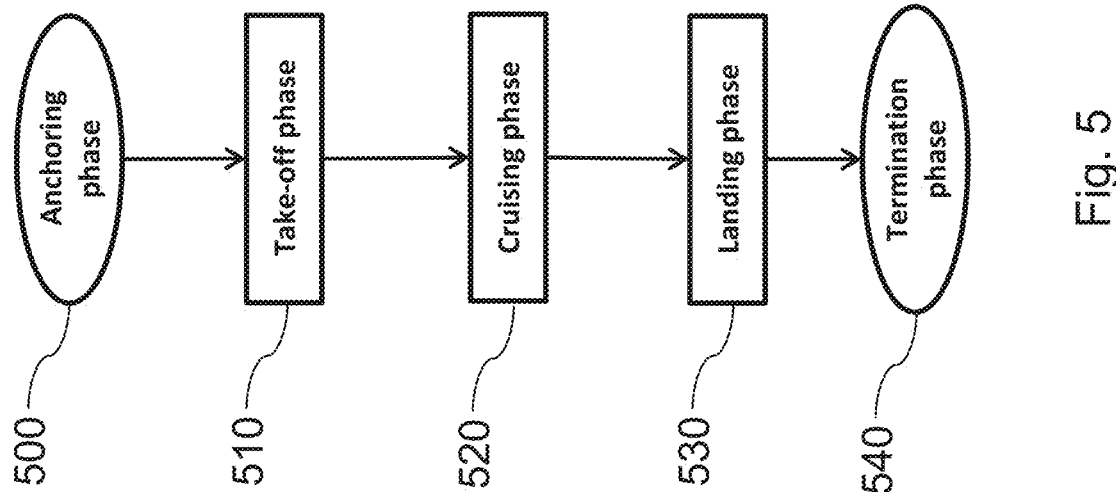
FIG. 5 shows an illustrative flow chart of a method for vertical take-off and landing of an aircraft as shown in FIGS. 1a and 1b, in accordance with the present embodiment of the invention.

With reference to FIG. 5, the following will describe a method for allowing the fixed-wing aircraft 110 to take off and land vertically relative to the supporting plane 101 under the aircraft 110.

At step 500 an anchoring phase is carried out, in which the module 200, comprising at least one propulsion unit 240 and the actuator means 245, is operatively connected to the aircraft 110 by means of a support structure 230. During this phase, some components of the aircraft 110, e.g. one or more undercarriages, may have to be removed to allow anchoring the module 200, e.g. to a bottom portion of the fuselage of the aircraft 110. During the anchoring phase, each one of the two or more frames 201 of the module 200 may be anchored, through the anchoring means 220, to at least one further frame of a portion of the fuselage of the aircraft 110. In particular, as previously described with reference to FIG. 2, two or more ribs 202 and the two or more frames 201 may be configured to define the support structure 230 of the module 200.

At step 510 a take-off phase is carried out, in which the actuator means 245 move at least one propulsion unit 240 from the inside of the module 200 towards the outside, which generates a propulsive force substantially perpendicular to the supporting plane 101 under the aircraft 110. For example, during this phase the aircraft 110 is initially resting on the supporting plane 101 and all the propulsion units 240 may be positioned inside the module 200, i.e. within the support structure 230. Subsequently, the control unit 300 activates the actuator means 245, which move at least one propulsion unit 240 from the inside of the module 200 towards the outside; preferably, a first number of propulsion units 240 are moved, which are necessary to ensure the vertical take-off of the aircraft 110. As previously described with reference to FIG. 2, during the take-off phase at least one opening 231 in the support structure 230 allows at least one propulsion unit 240 to be moved from a region internal to the module 200, defined by the support structure 230 itself, to a region external to the module 200. Advantageously, each propulsion unit 240, when it is external to the module 200, generates a propulsive force substantially perpendicular to the supporting plane 101 under the aircraft 110, i.e. it generates a vertical thrust of the aircraft 110, which will thus take off vertically. During the vertical take-off, the control unit 300 may appropriately adjust the propulsive force of each propulsion unit 240 either autonomously or in accordance with the first electric signals representative of the commands issued by the pilot of the aircraft 110, e.g. for controlling the aircraft 110 in relation to pitch, roll and yaw axes. Once a predefined height has been reached, an engine of the aircraft 110 is activated in order to generate a lift force on the wing of the aircraft 110. During the vertical take-off, the control unit 300 may appropriately control the engine of the aircraft 110 either autonomously or in accordance with the first electric signals representative of the commands issued by the pilot of the aircraft 110. When such lift force allows the aircraft 110 to fly, the control unit 300 will execute the following step 520.

At step 520 a cruising phase of the aircraft 110 is executed, in which the control unit 300 deactivates each propulsion unit 240, canceling its propulsive force, and the actuator means 245 move at least one propulsion unit 240 from the outside towards the inside of the module 200, preferably moving into the module 200 those propulsion units 240 which were used during the take-off phase described at step 510. During this phase, the aircraft 110 is flying, e.g. it is following a flight plan, and is supported by the lift force acting upon the wing of the aircraft 110, generated by the engine of the aircraft 110 itself.

At step 530 a landing phase is carried out, in which the actuator means 245 move at least one propulsion unit 240 from the inside of the module 200 towards the outside, which generates a propulsive force substantially perpendicular to the supporting plane 101 under the aircraft 110. For example, during this phase all the propulsion units 240 may be positioned inside the module, i.e. within the support structure 230. Subsequently, the control unit 300 activates the actuator means 245, which move out of the module 200 at least one propulsion unit 240, preferably a second number of propulsion units 240 which are necessary to ensure the vertical landing of the aircraft 110. As previously described with reference to FIG. 2, during the landing phase at least one opening 231 in the support structure 230 allows at least one propulsion unit 240 to be moved from a region internal to the module 200, defined by the support structure 230 itself, to a region external to the module 200.

Once the predefined height has been reached, each propulsion unit 240 external to the module 200 generates a propulsive force substantially perpendicular to the supporting plane 101 under the aircraft 110, i.e. a vertical thrust of the aircraft 110, which thus lands vertically on the supporting surface 101. During the vertical landing, the control unit 300 may appropriately adjust the propulsive force of each propulsion unit 240 either autonomously or in accordance with the first electric signals representative of the commands issued by the pilot of the aircraft 110. At the same time, during the vertical landing, the engine of the aircraft 110 is preferably controlled in such a way as to diminish its thrust, in order to reduce the speed of the aircraft 110 and consequently the lift force acting upon the wing of the aircraft 110. For example, during the vertical landing the control unit 300 may appropriately control the engine of the aircraft 110 either autonomously or in accordance with the first electric signals representative of the commands issued by the pilot of the aircraft 110.

At step 540 the control unit 300 executes a termination phase, in which all the operations necessary for terminating the method for vertical take-off and landing of the aircraft 110 according to the present invention are carried out. During this phase, for example, the control unit 300 deactivates each propulsion unit 240, canceling its propulsive force, and the actuator means 245 move at least one propulsion unit 240 from the outside towards the inside of the module 200, preferably moving into the module 200 those propulsion units 240 which were used during the landing phase described in step 530. At the end of this phase, the aircraft 110 is resting on the supporting surface 101.

One or more phases of the method described above with reference to FIG. 5 may be implemented, for example, by means of a computer program product comprising portions of software code, which can be loaded into a memory of a terminal, such as, for example, a terminal comprising an FPGA board or a SoC-FPGA board, etc.

It will be apparent to those skilled in the art that the present invention advantageously allows an aircraft 110 originally configured exclusively for horizontal take-off and landing to also take off and land vertically.

Thus, the aircraft 110 can take off from a vertical take-off platform, which is advantageously smaller than a conventional horizontal take-off runway normally usable by the aircraft 110. Advantageously, the present invention permits the use of the aircraft 110 for urban air mobility (UAM) purposes.

Figure 6:
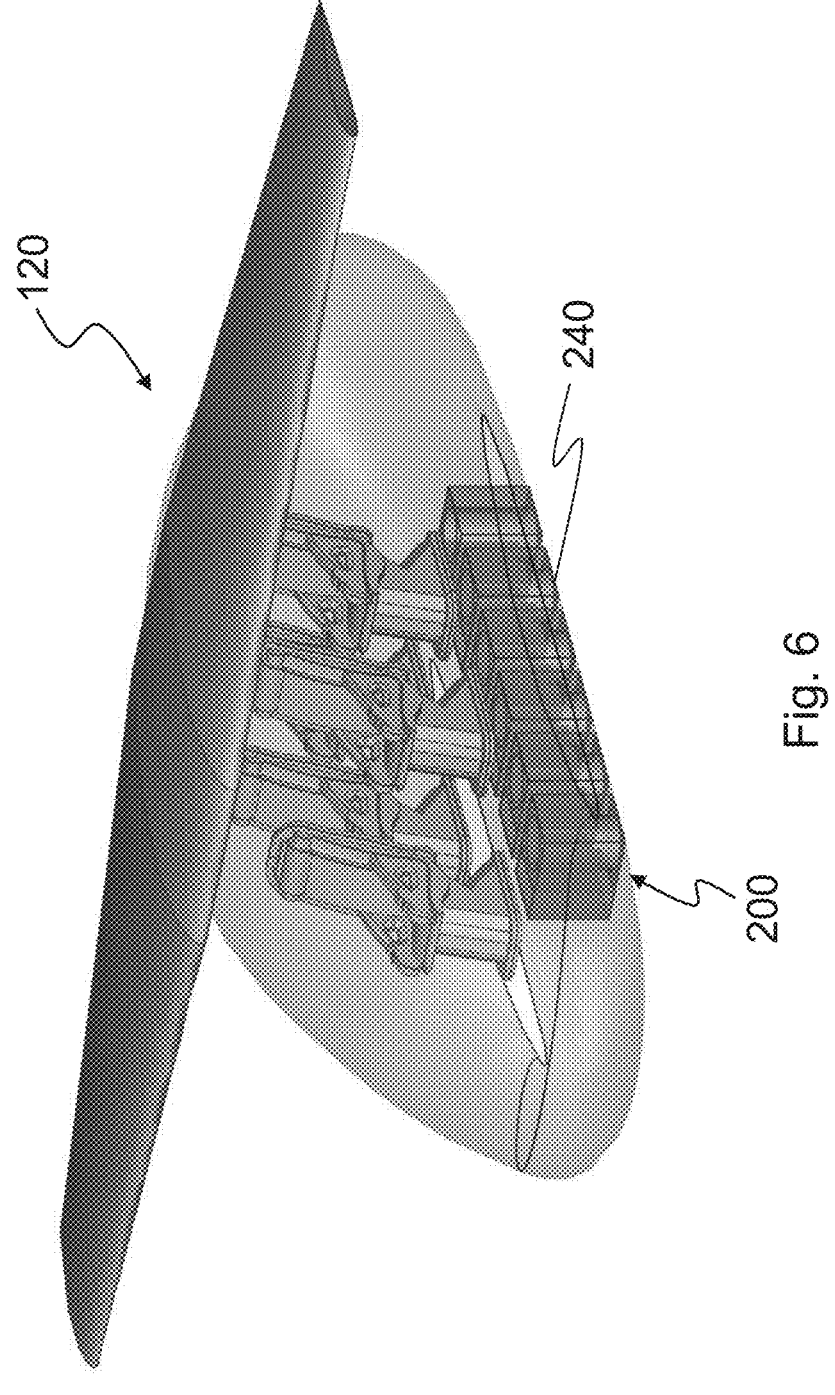
FIG. 6 shows an aircraft comprising a vertical take-off and landing module, in accordance with another embodiment of the invention.

With reference to FIG. 6, there is exemplified another embodiment of the invention wherein another aircraft 120 may natively comprise the module 200 in accordance with the above description of the previous embodiment of the invention. In particular, the module 200 may be integrated into the fuselage of the aircraft 120. As in the previous embodiment, the aircraft 120 may comprise a main motor (not shown in FIG. 6) for the execution of the take-off, cruising and landing phases described above with reference to the steps 510, 520 and 530 of the method. It will be apparent to those skilled in the art that the present invention advantageously allows the fixed-wing aircraft 120, natively equipped with the module 200, to take off and land vertically. Thus, the aircraft 120 can take off from a vertical take-off platform, which is advantageously smaller than a horizontal take-off runway normally usable by the aircraft 120. Advantageously, the present invention permits the use of the aircraft 120 for urban air mobility (UAM) purposes.

The advantages of the present invention are apparent from the above description.

The present invention provides a module, a method and a system for vertical take-off and landing of a fixed-wing aircraft, which advantageously make it possible to reduce the mechanical complexity of the aircraft. In fact, the module according to the present invention can be easily anchored to the aircraft and, advantageously, implements all the functionalities necessary to allow the aircraft to take off and land vertically, without requiring the aircraft to be redesigned or heavily modified.

Another advantage of the present invention lies in the fact that it provides a module, a method and a system for vertical take-off and landing of a fixed-wing aircraft which advantageously make it possible to maintain a good aerodynamic efficiency of the aircraft itself. In fact, the module can be designed to minimize the frictions and/or turbulences acting upon the aircraft and/or the module itself.

A further advantage of the present invention lies in the fact that it provides a module, a method and a system for vertical take-off and landing of a fixed-wing aircraft which advantageously make it possible to reduce the complexity of the flight approval process, on the part of certifying bodies, for the aircraft. In fact, the module can be approved separately, and it will only be necessary to obtain a partial certification for the modification that includes the installation of the module to the aircraft.

Of course, without prejudice to the principle of the invention, the forms of embodiment and the implementation details may be extensively varied from those described and illustrated herein merely by way of non-limiting example, without however departing from the protection scope of the present invention as set out in the appended claims. For example, as shown in FIG. 7 and in accordance with the above description, in one possible embodiment of the invention the module 200 may comprise two or more propulsion units 240 so arranged, e.g. side-by-side and/or stacked, as to obtain a balanced vertical thrust relative to a longitudinal axis 205 of the aircraft 110.

The invention claimed is:

1. A fixed-wing aircraft adapted for vertical take-off and landing, comprising:
    a fuselage;
    a fixed-wing; and
    a module for supporting the vertical take-off and landing of the fixed-wing aircraft from a supporting plane, said module comprising:
        a support structure, at least one propulsion unit adapted to be mounted within the support structure,
        an actuator for moving said at least one propulsion unit from a region internal to the module defined by the support structure to a region external to the module, and
        one or more anchoring elements connecting the support structure to a bottom portion of the fuselage,
        wherein said actuator is adapted to linearly move said at least one propulsion unit transversely to the aircraft from the inside of the module towards the outside, and retractable during flight, and said at least one propulsion unit is adapted to generate a propulsive force substantially perpendicular to the supporting plane under the aircraft.

2. The fixed-wing aircraft according to claim 1, wherein the module comprises at least one pair of propulsion units arranged symmetrically on opposite sides relative to the longitudinal axis and/or a median plane.

3. The fixed-wing aircraft according to claim 2, wherein said at least one pair of propulsion units is configured such that a center of gravity of the module remains in a stable position along a longitudinal axis of the aircraft in both a retracted condition when the propulsion units are inside the module and an extended condition when the propulsion units are outside the module.

4. The fixed-wing aircraft according to claim 2, wherein said support structure is configured such that a distribution of weights of the propulsion units is balanced in relation to the aircraft both when the propulsion units are extended outside the module and when the propulsion units are retracted inside the module.

5. The fixed-wing aircraft according to claim 1, wherein said support structure is adapted to be anchored to at least one portion of the fuselage of the aircraft.

6. The fixed-wing aircraft according to claim 1, wherein the module comprises at least one opening in said support structure, configured to allow said at least one propulsion unit to be moved from a region internal to the module, defined by the support structure itself, to a region external to the module, and vice versa.

7. The fixed-wing aircraft according to claim 6, wherein said at least one opening (231) is configured such that said at least one propulsion unit, when moved into the module, partially or completely closes said at least one opening by means of a portion of an external surface of said at least one propulsion unit.

8. The fixed-wing aircraft according to claim 1, wherein the one or more anchoring elements are selected from a group consisting of: rivets, screws, bolts, hooks, buttons, clamps, pins and brackets.

9. The fixed-wing aircraft according to claim 1, wherein said actuator comprises at least one electromechanical servo mechanism.

10. The fixed-wing aircraft according to claim 9, wherein said electromechanical servo mechanism is a linear electromechanical servo mechanism.

11. The fixed-wing aircraft according to claim 1, wherein said at least one propulsion unit (240) comprises a ducted fan.

12. The fixed-wing aircraft according to claim 11, wherein said ducted fan is housed in a support (241*a*) that forms part of said support structure.

13. The fixed-wing aircraft according to claim 1, wherein said at least one propulsion unit comprises a fan blade.

14. The fixed-wing aircraft according to claim 1, wherein said actuator moves said at least one propulsion unit in a direction transverse to a longitudinal axis (205) of the aircraft without rotation of said at least one propulsion unit about a pivot point on the fuselage.

15. The fixed-wing aircraft according to claim 1, wherein the module further comprises one or more guides (232) operatively connected to the at least one propulsion unit, and wherein said actuator is configured to move said at least one propulsion unit along said guide(s) from said region internal to the module to said region external to the module.

16. A method for vertical take-off and landing of the fixed-wing aircraft of claim 1 wherein the method comprises:

providing the fixed wing aircraft of claim 1;

using the actuator in a take-off and landing phase to move said at least one propulsion unit from the inside of the module towards the outside, and vice versa, transversally to the aircraft, and wherein said at least one propulsion unit generates a propulsive force which is substantially perpendicular to a supporting plane under said fixed-wing aircraft;

using the actuator in a cruising phase to move said at least one propulsion unit into the module.

17. The method according to claim 16, comprising an anchoring phase in which said support structure is anchored to at least one portion of the fuselage of the aircraft.

18. The method according to claim 16, wherein during said take-off and landing phase at least one opening in said support structure allows said at least one propulsion unit to be moved from a region internal to the module, defined by the support structure itself, to a region external to the module, and vice versa.

* * * * *